(12) United States Patent
Patsenker et al.

(10) Patent No.: US 8,898,261 B1
(45) Date of Patent: Nov. 25, 2014

(54) CONFIGURING AGENT SERVICES OPERABLE BY AGENTS IN A STORAGE AREA NETWORK

(75) Inventors: Svetlana Patsenker, Wayland, MA (US); Boris Farizon, Westborough, MA (US); Rajesh K. Gandhi, Shrewsbury, MA (US); Keith A. Carson, Jr., Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1200 days.

(21) Appl. No.: 11/772,552

(22) Filed: Jul. 2, 2007

(51) Int. Cl.
  *G06F 15/177* (2006.01)

(52) U.S. Cl.
  USPC ............................. 709/220; 709/213; 709/229

(58) Field of Classification Search
  USPC .......................................................... 709/220
  See application file for complete search history.

(56) References Cited

U.S. PATENT DOCUMENTS

| | | | | |
|---|---|---|---|---|
| 5,892,171 A * | 4/1999 | Ide | | 84/622 |
| 6,735,691 B1 * | 5/2004 | Capps et al. | | 713/1 |
| 6,966,033 B1 * | 11/2005 | Gasser et al. | | 715/738 |
| 7,624,152 B2 * | 11/2009 | Zellner et al. | | 709/206 |
| 2003/0093509 A1 * | 5/2003 | Li et al. | | 709/223 |
| 2003/0154271 A1 * | 8/2003 | Baldwin et al. | | 709/223 |
| 2003/0191758 A1 * | 10/2003 | Majewski et al. | | 707/3 |
| 2005/0119906 A1 * | 6/2005 | Lee et al. | | 705/1 |
| 2005/0216860 A1 * | 9/2005 | Petrov et al. | | 715/810 |
| 2006/0294103 A1 * | 12/2006 | Wood | | 707/9 |
| 2008/0301333 A1 * | 12/2008 | Butler et al. | | 710/38 |

* cited by examiner

*Primary Examiner* — Viet Vu
*Assistant Examiner* — Herman Belcher
(74) *Attorney, Agent, or Firm* — Krishnendu Gupta; Gerald P. Kazanjian

(57) ABSTRACT

Data structures, methods, and apparatus useful in configuring agent services operating in a storage area network are provided. The data structures may include a list of agent types for which agent services are configurable for operation by agents of those agent types in a storage area network; for each agent type in the list of agent types, a corresponding list of configurable agent services operable by agents of the agent type; for each configurable agent service in each list of configurable agent services, a corresponding list of configurable parameters for the configurable agent service; and for each configurable parameter in each list of configurable parameters, at least one parameter value associated with the configurable parameter. Procedures and apparatus are provided for configuring agent services by updating elements of the data structures and providing the updated elements to the agent services.

19 Claims, 4 Drawing Sheets

CONFIGURING AGENT SERVICES OPERABLE BY AGENTS IN A STORAGE AREA NETWORK

FIELD OF THE INVENTION

The present disclosure relates generally to managing storage area networks. For example, embodiments disclosed herein can be used to provide effective and efficient techniques for configuring agent services in a storage area network.

BACKGROUND OF THE INVENTION

Modern computer and data processing systems manage and store large amounts of data. As an example, financial service industry businesses such as banks, mutual fund companies, or the like, often operate complex data processing systems and networks that require access to many hundreds of gigabytes or even terabytes of data. Data storage system developers have responded to these types of data storage requirements by integrating large capacity data storage systems known as storage arrays, as well as data communications devices and computer systems into networks called "storage networks" or "storage area networks" ("SANs").

In general, a storage area network includes data storage devices, such as disk array controllers and tape libraries, attached to servers, commonly referred to as host computers ("hosts"), via a communication infrastructure, such as a switching fabric. A storage area network also includes a SAN-management application, which manages resources in the storage area network to allow efficient operation of connections in the communication infrastructure, the storage devices, and host computers so that data transfers are secure and robust. An important characteristic of a storage area network is that the storage devices are generally available to multiple hosts at the same time, which helps make a storage area network scalable and flexible.

The host computers of a respective storage area network access data stored in respective data storage devices on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

A typical conventional SAN-management software application may have several different software components or processes that execute independently of each other in a distributed manner on different computer systems but that collectively interoperate together to perform network management. As an example, conventional designs of SAN-management applications can include console, server, agent, and storage or database management software components or processes that each perform a specific role in storage area network management.

Generally, the server component or process operates as a central control process within the SAN-management application and coordinates communication between the console, storage, and agent components. The console component or process often executes within a dedicated SAN-management workstation to allow a network administrator (i.e., a person or people responsible for management of the storage area network) to visualize and remotely control and manage the various components within the storage area network that are displayed on a graphical user interface within a display on the console computer system. Agent components or processes may execute, for example, on the various host computer systems such as servers distributed throughout the storage area network to manage various types of SAN resources. As an example, there may be different respective agents specifically designed (e.g., coded in software) to remotely manage, control, and collect data from data storage systems, hosts, database applications, storage area network switches, and so forth.

SUMMARY OF THE INVENTION

Large storage area networks typically comprise a large number of agent components ("agents"). These agents may be of different types. For example, agents may execute on hosts and may be responsible for collecting data concerning the operations of storage area network resources for which those agents are designed. As a specific example, there may be agents coded to communicate with switches, other agents coded to communicate with hosts, and still others designed or coded to communicate with data storage systems. Also, agents may differ depending on which operating system the agents were designed to execute upon, so there may be agents written for Unix hosts, and others written for Windows hosts. Each type of agent may be able to perform a plurality of agent services related to the specific type of resource for which that agent is designed to manage. As an example, if a host agent is operating on a Unix host, that host agent may have several services that can be turned on or off to collect more or less data concerning the operation of the Unix host. The particular agent services that are active for a given agent depends upon the functionality that the storage area network administrator (i.e., person responsible for configuring and managing the storage area network) desires and also depends upon what services have been licensed for use by that agent.

For a given agent service, that service may have a plurality of parameters that may be configurable by a SAN administrator to allow that service to operate in different manners. As an example, an organization may operate a host agent on a host and may have opted to pay a licensing fee to enable a host agent service called "File Level Reporting" or FLR. If licensed and enabled for a given host agent, FLR enables that host agent to collect detailed information concerning file information within file systems accessible to a host computer system operating in the storage area network. As a specific example, FLR can be used to have the host agent collect ages, sizes, and ownership information for specific types of files, such as MPEG files that might resides within a file system of the host. As another specific example, FLR can be used to determine the largest files in a file system, or the oldest, or owners who have the most files, and so forth. FLR is thus an example of an agent service that can be configured within a host agent to perform a variety of different collection and reporting tasks. This information might be useful to an administrator to determine how the file system is being used. Finally, each configurable parameter or an agent service such as FLR may have a plurality of different values that the parameter can take on depending on how the agent service is configured. Accordingly, configuring and managing these agents and agent services has become a more complex administrative task as the number of agents in a given storage area network increases.

Conventional agent services such as FLR have been configured using configuration files that are manually edited and setup by the administrator of the storage area network. As an example, for the FLR agent service, using a conventional storage area network management application, an administrator must manually edit a complex and specially formatted file (i.e., an FLR config file) that specifies the parameters to be used by a host agent when operating the FLR service. This process of setting up and maintaining configuration parameters for agent services is cumbersome since it requires the administrator to understand the file format and agent service parameter structure, parameters names, and possible parameter values. This is often edited by hand in conventional systems and if not done properly, results in an error in operation of the agent service. As a result, conventional techniques for providing parameters associated with configuration of agent services for use by agents operating in a storage area network suffer from serious deficiencies.

Inventive matter disclosed herein significantly overcomes such deficiencies and improves upon conventional technology such as that discussed above and other technology also known in the prior art. Embodiments disclosed herein provide for effective and efficient techniques for configuring agent services in a storage area network. Particular embodiments described herein may pertain to specific apparatus and method elements implementable on an electronic device such as a computer system. Other particular embodiments may be implemented as a computer program product or software for use with an electronic device. The programs defining the functions of these embodiments may be delivered to an electronic device via a variety of signal-bearing media, which include, but are not limited to:

(1) machine-readable medium (e.g., random access memory; read-only memory; and storage disks such as hard drives, floppy disks, and CD-ROMs);

(2) information conveyed to an electronic device by a communications medium, such as through a electronic device or a telephone network accessed via a network, including wireless communications. Such signal-bearing media, when carrying machine-readable instructions that direct the functions of the present invention, represent embodiments of the present invention.

In a first example embodiment, a data structure that may be useful in configuring agent services and managing storage area networks is disclosed. The data structure may be encoded on a signal-bearing medium (e.g., a computer-readable medium) and comprises a list of agent types for which agent services are configurable for operation by agents of those agent types in a storage area network. For each agent type in the list of agent types, the data structure includes a corresponding list of configurable agent services operable by agents of the agent type. For each configurable agent service in each list of configurable agent services, the data structure includes a corresponding list of configurable parameters for the configurable agent service. For each configurable parameter in each list of configurable parameters, the data structure includes at least one parameter value associated with the configurable parameter.

In a second example embodiment, an agent-service-configuration manager (e.g., a computer software application) is provided that operates a method, which may be useful in configuring agent services and managing storage area networks, is disclosed. The agent-service-configuration manager operates the method that includes displaying, for example in a graphical user interface, a list of agent types for which agent services are configurable for operation by agents of those agent types in a storage area network. The agent-service-configuration manager receives a selection of a specific agent type and receives a selection of a specific, configurable, agent service for the selected agent type, and also receives a selection of at least one specific configurable parameter for the selected agent service. As the user selects, for example via a graphical user interface, the agent types, such as a host agent, the agent-service-configuration manager is able to dynamically determine what configurable agents services (e.g., FLR or other host agent services) are available (e.g., licensed) for that agent type. Once the service is selected, the agent-service-configuration manager is also able to determine and display, in real time, those parameters that are configurable for that selected agent service. The agent-service-configuration manager then receives a selection of a parameter value associated with the selected parameter corresponding to the selected agent service. This graphical user interface of the agent-service-configuration manager thus allows a user to easily configure the agent service via display (and then input from a user) of an agent type that then determines agent services (that are displayed for selection by the user) and then, based on the selected agent service, the agent-service-configuration application displays available parameters that can be configured and the user can enter desired parameters values (e.g., via pull down menus that list available values, or via text entry of values). The agent-service-configuration manager then stores a parameter association of the selected agent type, the selected agent service, the selected parameter(s), and the selected parameter value(s). In particular embodiments, the method may utilize data structures and example graphical user interfaces disclosed herein. For example, the parameter association may be stored in data structure, such as the data structure described above as a first embodiment disclosed herein.

In a third example embodiment, an apparatus that may be useful in configuring agent services and managing storage area networks is disclosed. The apparatus comprises a processor; a memory unit that stores instructions associated with an application executable by the processor; and an interconnect coupling the processor and the memory unit, enabling the apparatus to execute the application and perform methods disclosed herein.

BRIEF DESCRIPTION OF THE DRAWINGS

Objects, features, and advantages of inventive matter disclosed herein may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION OF THE INVENTION

Embodiments disclosed herein can be advantageously utilized in configuring agent services and managing storage area networks. In particular embodiments, agent services performable by agents in a storage area network are configurable by changing the values of configurable parameters corresponding to the configurable agent services in an easy manner that avoids the pitfalls of manually entry of agent service parameters into configuration files as found in conventional systems.

Figure 1:
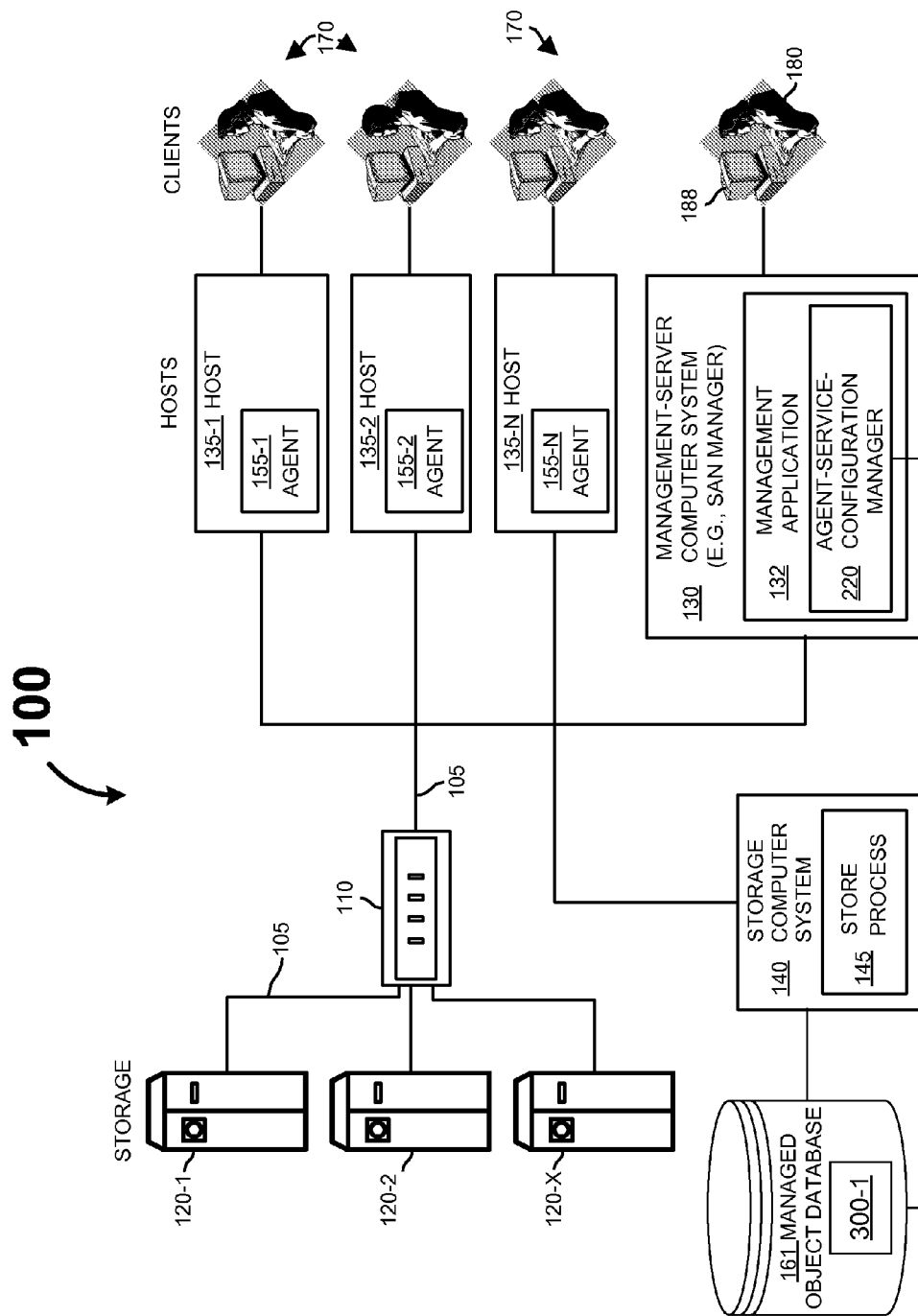
FIG. 1 illustrates an example storage area network and computing system environment configured to operate in accordance with embodiments disclosed herein.

FIG. 1 illustrates an example of a networking environment suitable for use in explaining example embodiments. In this example, the networking environment is a storage area network 100 that includes a communications medium 105 that interconnects a plurality of data storage systems 120-1 through 120-X through one or more connectivity devices 110 (e.g., SAN switches) to a plurality of host computer systems 135-1 through 135-N that serve data to client computer systems 170.

This example storage area network 100 includes a management-server computer system 130 that operates a management application 132 (i.e., a computer software application). In addition, the storage area network 100 includes at least one storage computer system 140 that, in this example, operates at least one store process 145. Processing performed by the store process 145 collects, stores, and processes various resource data accessible from a managed object database 161 by the management application 132. A plurality of agent software processes 155-1 through 155-N operate within one or more of the host computer systems 135-1 through 135-N. These agent processes 155 can be configured to operate agent services that might require a variety of different configuration parameters to be specified by a user or storage area network administrator 180. Generally, the agents 155 and store processes 145 interoperate with, and are collectively considered parts of the management application 132. The management application 132 includes an agent service configuration manager 220, that when executing in a processor, is an agent-service-configuration process 220-2 that generally performs the tasks disclosed herein to collect and store agent service data via a graphical user interface and in an embodiment 300-1 of data structure 300 for use by agents 155. A network administrator 180 interacts via a console computer system 188 with the management application 132 executing on the management-server computer system 130 in order to remotely administer manageable resources within the storage area network 100 and to provide the agent service data for use by agent services as explained herein. Manageable resources include, for example, data storage systems 120, the connectivity devices 110, and the host computer systems 135, and many other types of hardware or software entities within the storage area network 100.

Figure 2:
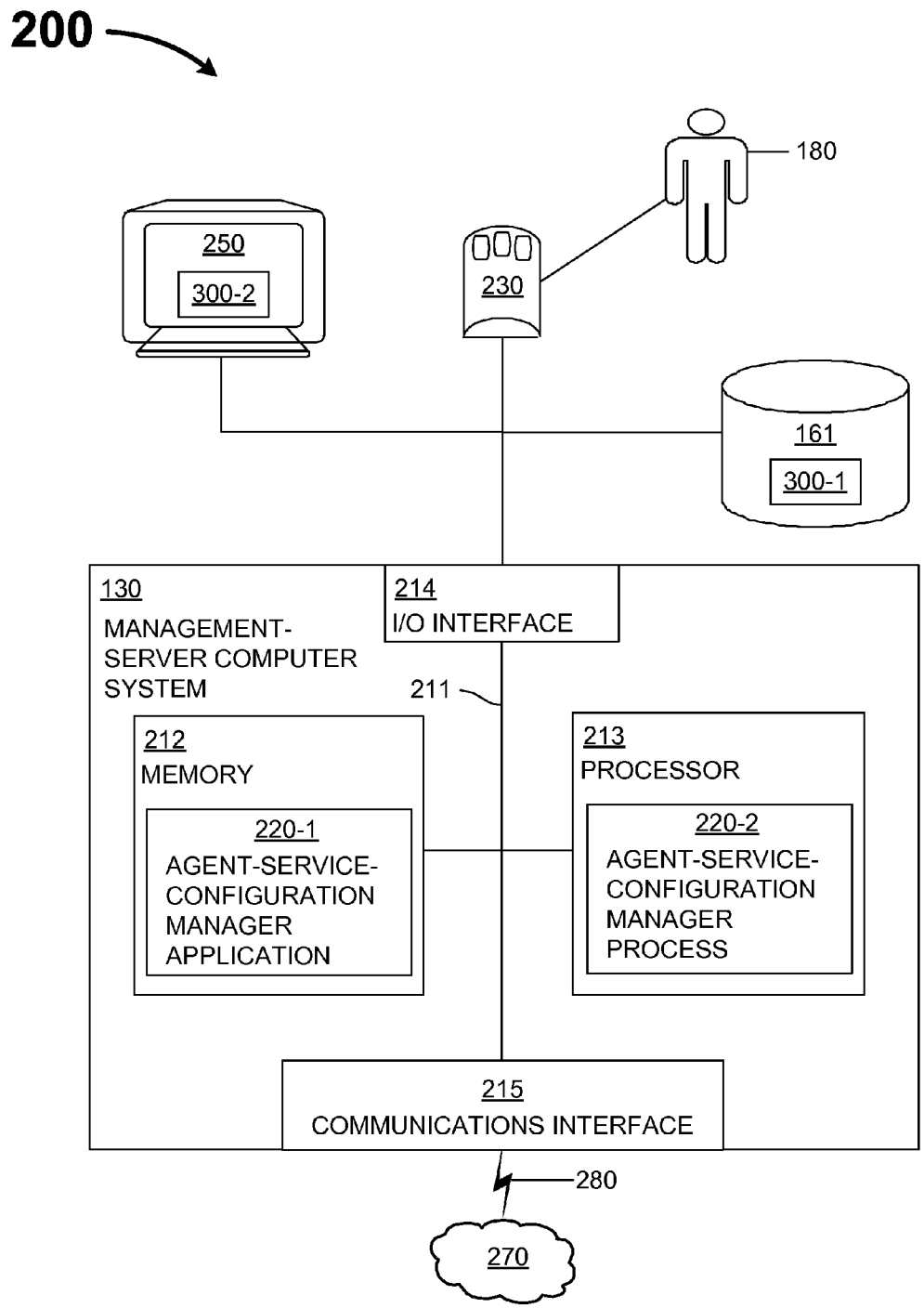
FIG. 2 illustrates an example apparatus useful in performing methods in accordance with embodiments disclosed herein.

FIG. 2 is a diagram of a computer environment 200 illustrating an example architecture of a respective management-server computer system 130 useful for executing an agent-service-configuration manager (i.e., methods, procedures, etc.) useful in configuring agent services in a storage area network, such as the storage area network 100 illustrated in FIG. 1, according to embodiments disclosed herein. Computer system 130 can be a computerized device such as a personal computer, workstation, portable computing device, console, network terminal, processing device, etc. As shown, computer system 130 of the present example includes an interconnect 211, such as a data bus or other circuitry, that couples a memory system 212, a processor 213, I/O interface 214, and a communications interface 215. The memory system 212 includes an embodiment 220-1 of the agent-service-configuration manager 220. The processor 213 also includes an embodiment 220-2 of the agent-service-configuration manager 220. An input device 230 (e.g., one or more user/developer-controlled devices such as a keyboard, mouse, touchpad, trackball, etc.) couples to the processor 213 through the I/O interface 214 and enables a user 180 (e.g., a SAN administrator) to provide input commands and generally interact with a graphical user interface that the agent-service-configuration manager application 220-1 and the agent-service-configuration manager process 220-2 provide on a display 250. This allows the user 180 to input the agent-service data into the graphical user interface on the display 250 as will be explained. The graphical user interface displays the agent-service data as an embodiment 300-2 of the data structure 300. I/O interface 214 potentially provides connectivity to peripheral devices such as the input device 230, display screen 250, storage device 161, etc. The computer environment 200 allows the computer system 130 to access a database 161 in a storage device that can be used for storing agent service data (e.g., in data structure 300) obtained, for example, from the user 180 via a graphical user interface on the display 250 related to configuring agent services in accordance with embodiments disclosed herein. Communications interface 215 enables computer system 130 to communicate with network 270 over the communication link 280 to retrieve and transmit information from remotely located sources if necessary.

As shown, memory system 212 can be any type of computer-readable medium and in this example is encoded with an agent-service-configuration application 220-1 that supports functionality as herein described. Agent-service-configuration application 220-1 can be embodied as computer software code such as data and/or logic instructions (e.g., code stored in the memory or on another computer-readable medium such as a floppy disk or a hard drive) that supports processing functionality according to different embodiments described herein. During operation of the computer system 130, processor 213 accesses the memory system 212 via the interconnect 211 in order to launch, run, execute, interpret, or otherwise perform the logic instructions of the agent-service-configuration application 220-1. Execution of the agent-service-configuration application 220-1 produces processing functionality in an agent-service-configuration process 220-2. In other words, the agent-service-configuration process 220-2 represents one or more portions of the agent-service-configuration application 220-1 performing within or upon the processor 213 in the computer system 130. Those skilled in the art will understand that the computer system 130 can include other processes and/or software and hardware components, such as an operating system that controls allocation and use of hardware resources.

It should be noted that, in addition to the agent-service-configuration process 220-2 that carries out method operations as discussed herein, other embodiments herein include the agent-service-configuration application 220-1 itself (i.e., the un-executed or non-performing logic instructions and/or data). The agent-service-configuration application 220-1 may be stored on a computer-readable medium such as a floppy disk, hard disk, or in an optical medium. According to other embodiments, the agent-service-configuration application 220-1 can also be stored in a memory type system such as in firmware, read-only memory (ROM), or, as in this example, as executable code within the memory system 212 (e.g., within Random Access Memory or RAM). Thus, it should be understood that embodiments disclosed herein include logic encoded in one or more tangible media for execution and, when executed, operable to perform methods and processes disclosed herein. Such logic may be embodied strictly as computer software, as computer software and hardware, or as hardware alone.

Figure 3:
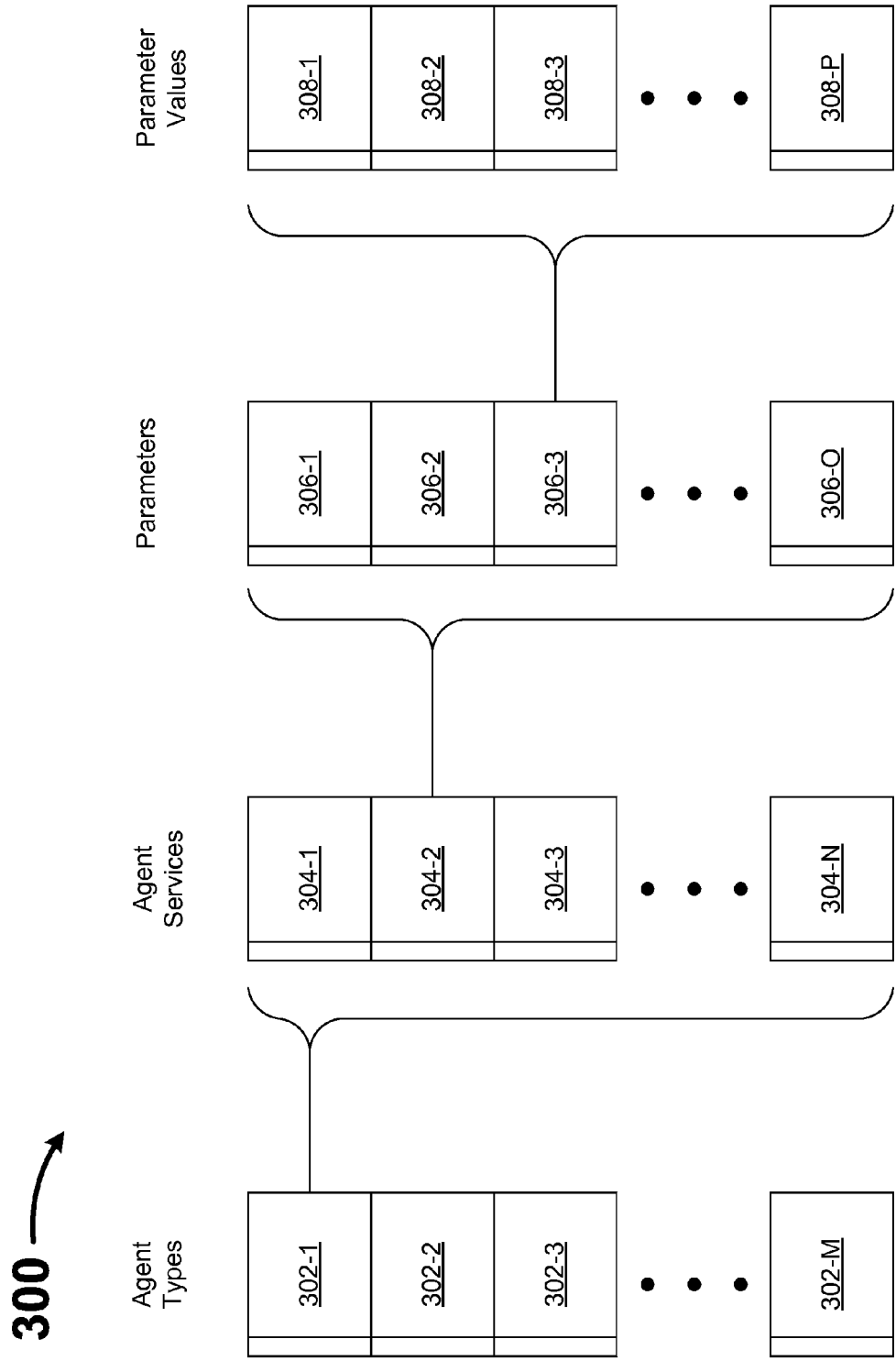
FIG. 3 illustrates a data structure useful in configuring agent services and managing storage area networks in accordance with embodiments disclosed herein.
Figure 4:
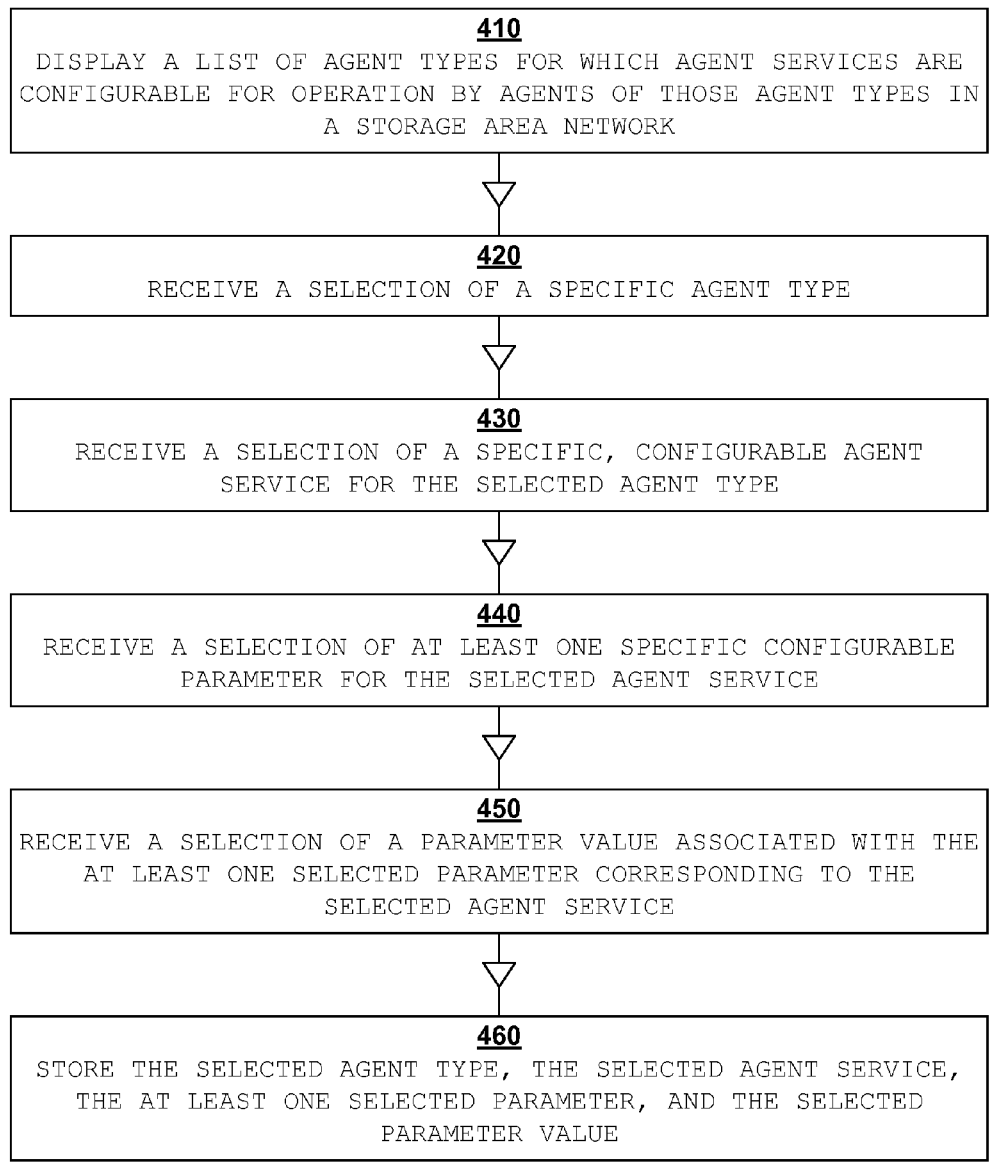
FIG. 4 shows a flowchart illustrating operations useful in configuring agent services and managing storage area networks in accordance with embodiments disclosed herein.

Functionality supported by computer system 130 and, more particularly, functionality associated with agent-service-configuration application 220-1 and agent-service-configuration process 220-2 is herein discussed in relation to FIGS. 3-4. For purposes of the following discussion, computer system 130 generally is capable of implementing techniques and procedures in FIGS. 3-4. However, other systems can be configured to provide similar functionality.

FIG. 3 illustrates a data structure for storing agent service data 300 useful in configuring and managing storage area networks in accordance with embodiments disclosed herein. The data structure 300 comprises a list of data types 302 numbered from 302-1 to 302-M. Agents 155 (from FIG. 1) may be of many different types. For example, there may be switch agents, host agents, and storage agents that execute on hosts 135, but that are responsible for collecting data and communicating with specific switches, hosts, or storage systems for which each is designed and coded. Importantly, each agent 155 may be coded to enable operation of one or more agent services. From the example above, a host agent 155-1 might be equipped (i.e. enabled with software and logic) to operate the File Level Reporting (FLR) host agent service. A switch agent 155-2 may likewise have certain switch related services that can be configured in various manners depending on how the administrator 180 desires to control the storage area network switches 110 (from FIG. 1).

It is to be understood that the data structure 300 shown in FIG. 3 may provide a layout for a graphical user interface that the agent-service-configuration application 220-1 or process 220-2 (the process 220-2 is an executing version of the application 220-1) can provide to the user 180 to easily configure agent services. As an example, when the user 180 operates the agent-service-configuration application 220-1 to configure agent services, he or she can be presented with a graphical user interface that appears with a list of agent types 302 as shown on the left side of the structure 300. When the user 180 (from FIG. 2) selects a specific agent type 302 (e.g., from a pull down menu or full list of all agent types), the agent-service-configuration application 220-1 can then determine what agent services 304 are associated with that agent type 302 and can then display these for selection by the user 180. Once the user 180 then selects a particular agent service 304 to configure, the agent-service-configuration application 220-1 can determine what parameters 306 are associated with that selected service 304 and can display these parameters 306 on the graphical user interface of a display 250, for example, as a list or in a pull-down menu. When the user 180 then selects a specific parameter 306, the agent-service-configuration application 220-1 can display the parameter values 308 associated with that user-selected parameter 306. If a parameter value is already present, the current value can be displayed. If the service 304 or parameter 306 is being configured for the first time, the parameter value 308 may be blank or may contain a default value. Using the structure 300 shown in FIG. 3, and displaying this as a sequence of menus, options or other selectable parts of a graphical user interface, the agent-service-configuration application 220-1 makes configuration of agent services easy and less prone to error. As values are received from the user, the agent-service-configuration application 220-1 can store these in a configuration file so that when an agent 155 begins operation, that management application 132 (from FIG. 1) can provide the agent 155 with the correct agent service configuration as input and selected by the user via a graphical user interface that represents the data shown in FIG. 3. It is to be understood that the data structure 300 of FIG. 3 may be embodied in a graphical user interface in which the user, as explained in the examples above, inputs the agent service configuration parameter values. It is also to be understood that such selections and input can be done in a variety of manners, such as via pull-down menus, lists, checkboxes, radio buttons, or the like and that a particular layout of a graphical user interface embodying the data structure 300 in FIG. 3 is not limiting.

The term "list" as used herein, unless expressly stated otherwise, is not meant to imply any particular structure for storing the list on a computer-readable medium, for example, or for displaying the list on a computer screen, for example. A list of items may include a single item or a list may include a plurality of items. Similarly, the data structure 300 may be implemented in a variety of ways in a signal-bearing medium, for example. One of ordinary skill in the art of computer programming can implement the data structure 300 without undue experimentation.

For each agent type 302 in the list of agent types 302, the data structure 300 includes a corresponding list of configurable agent services operable by the agent type 302. For example, the agent type 302-1 may be a host agent and the list of agent services 304, numbered from 304-1 to 304-N, may include agent services that agents of the agent type 302-1 perform on hosts in a storage are network. The list of corresponding agent services 304 may include, for example, a file-level reporting service and an email service.

For each configurable agent service 304 in the list of configurable agent services 304, the data structure 300 includes a corresponding list of configurable parameters. For example, the configurable agent service 304-1 has a corresponding list of configurable parameters 306 numbered from 306-1 to 306-P. Different configurable agent services 304 will generally have different lists of corresponding parameters. However, in particular embodiments, different configurable agent services may have some similar or even some identical parameters in their respective list of configurable parameters.

For each configurable parameter in each list of configurable parameters, the data structure 300 includes at least one parameter value associated with the configurable parameter. For example, the configurable parameter 306-3 has a list of parameter values 308, numbered from 308-1 to 308-P, associated with the configurable parameter 306-3.

Agent services and parameters are configurable in that they can both be configured by setting or changing at least one value associated with a parameter. That is, a parameter may be configured by changing a value associated with it. For example, if an agent-service-configuration manager 220 changes one or more parameter values 308 (e.g., 308-1) associated with the configurable parameter 306-3 as a result of receiving input from a user, for example, then the parameter 306-3 will be configured as a result of the change of the value(s). The operation of agent services 304 are determined by the values of their corresponding configurable parameters 306. Thus, the agent service 304-2 will also be configured by the change in the value of one or more parameter values 308 (e.g., 308-1) associated with the configurable parameter 306-3.

FIG. 4 shows a flowchart illustrating example operations 400 useful in configuring agent services in a SAN in accordance with embodiments disclosed herein. For example, the operations 400 may be performed by an agent-service-configuration manager 220 executing on the management-server computer system 130 shown in FIG. 1. A SAN administrator 180 may interact with the agent-service-configuration manager 220 to configure agent services such as services performed by agents 155 executing on hosts 135 in the storage area network 100 of FIG. 1.

In step 410, the agent-service-configuration manager 220 displays a list of agent types 302 for which agent services are configurable for operation by agents 155 of those agent types in a storage area network. In particular embodiments, the presence of a particular agent type in the list of agent types indicates that at least one agent of the particular agent type is operating in the storage area network. In particular embodiments, the agent-service-configuration manager 220 may retrieve the list of agent types 302 to be displayed from an embodiment of the data structure 300, which may be stored on a disk such as in the managed object database 161 (e.g., 300-1), or in a configuration file, for example. The agent-service-configuration manager 220 may also store the data structure 300 in the management-server computer system's 130 memory or the computer's 180 storage device, for example. In particular embodiments, the agent-service-configuration manager 220 displays the list of agent types 302 in a menu, such as a pull-down menu or the like, allowing a SAN administrator 180 to select an agent type, for example, by using a computer mouse to place a cursor over the selected data type and clicking on the selected data type.

In step 420, the agent-service-configuration manager 220 receives a selection of a specific agent type 302. In response to receiving the selection of a specific agent type, the agent-service-configuration manager 220 may determine agent services 304 that are operable by agents of the selected agent type. In particular embodiments, determining agent services that are operable by agents of the selected agent type may include utilizing licensing information associated with the storage area network to determine what agent services 304 have been licensed for the specific agent type 302 within that storage area network. Thus, in particular embodiments, the presence of a particular agent service 304 in the corresponding list of agent services (e.g. the list of services 304 in FIG. 3) indicates that the agent-service-configuration application 220-1 has determined that the particular agent service 304 has been licensed for the corresponding agent type 302 in the storage area network. For example, the list of agent services may be a list of all agent services licensed to be performed on a particular storage area network. In an alternate example, the list of agent services may be a list of all agent services licensed by a particular client to be performed on a particular storage area network. In another example, all agent services 304 may be graphically listed on a graphical user interface (e.g. having a layout similar to the design of the data structure 300 in FIG. 3), even those services not licensed or otherwise operable at that moment. Un-operable or un-licensed services 304 may be grayed-out or not selectable, but can be shown to the user so that he or she is aware of what is and is not available for configuration. In other words, by showing the user all agent services 304, the user is made aware of what they could license (if needed), and this may induce the user to take a license to other services in the future.

The agent-service-configuration manager 220 then displays a list of agent services 304 corresponding to the selected agent type 302. In particular embodiments, displaying a list of agent services corresponding to the selected agent type includes displaying a list of selectable agent services in a graphical user interface. Each displayed agent service has a corresponding license to operate in agents in the storage area network as determined by the licensing information. The manner of displaying the list of agent services may be similar or even the same as the manner (i.e., a menu, such as a pull-down menu) of displaying the agent types 302. The SAN administrator 180 may select one of the displayed agent services in a manner similar to the selection of an agent type described above.

The selected agent service may be, for example, a file-level-reporting ("FLR") service. A file-level-reporting service may generate and create reports relating to statistics about the usage in the storage area network of particular file types. For example, a file-level-reporting service may keep track of statistics such as total storage spaced use my certain file types, total number of files of certain file types, or frequency of access of files of certain file types. Information generated by a file-level-reporting service may be used, for example, in helping an administrator or client determine if more storage space should be utilized or if some storage space can be freed up by deleting or archiving old files that are no longer being accessed.

In step 430, the agent-service-configuration manager 220 receives a selection of a specific, configurable agent service 304 for the selected agent type 302. In response to receiving the selection of a specific agent service, the agent-service-configuration manager 220 may determine parameters 306 of the selected agent service that are configurable. The agent-service-configuration manager 220 may then display a list of configurable parameters 306-1 through 306-0 corresponding to the selected agent service 304. For example, if the agent-service-configuration manager 220 receives a selection of a file-level-reporting service, the agent-service-configuration manager 220 may determine that the following parameters 306 are configurable: "Audio Files", "Compressed Files", "Image Files", "Log Files", "Executable Files", "Temporary Files", "Database Files", "Email Files", "Office Files", "Backup Files", "CD Image Files", and "Multimedia Files", for example. The agent-service-configuration manager 220 may then display a list of file types (i.e., a list of the configurable parameters) on which the file-level-reporting service can be performed. The manner of displaying the list of parameters may be similar or even the same as the manner (i.e., a menu, such as a pull-down menu) of displaying the agent types. The SAN administrator 180 may select one of the displayed parameters in a manner similar to the selection of an agent type or the selection of an agent service as described above.

In step 440, the agent-service-configuration manager 220 receives a selection of a specific, configurable parameter 306 for the selected agent service. In response to receiving the selection of a specific parameter, the agent-service-configuration manager 220 may determine at least one parameter value 308 associated with the selected parameter. For example, the displayed value may represent the current or default setting or value 308 of the selected parameter 306. The agent-service-configuration manager 220 may then display at least one parameter value 308 associated with the selected parameter. For example, if the selected parameter 306 is "Audio Files", the agent-service-configuration manager 220 may display a list comprising "au", "mp3", "wav", and "wmf", indicating that the agent service (i.e., the file-level-reporting service) is currently configured to operate on these particular types or values 308 of audio files. By way of another example, if the selected parameter 306 is "Image Files", the agent-service-configuration manager 220 may display a list comprising "gif", "bmp", "jpg", "jpeg", "tif", "png", "psd", and "jif", indicating that the file-level-reporting service is currently configured to operate on these particular types or values 308 of image files.

The SAN administrator 180 may interact with the agent-service-configuration manager 220 through a graphical user interface, for example, to change one or more parameter values and that graphical user interface may appear as the user 180 make selections in the lists (302, 304, 206 and then 308) from left to right as shown in FIG. 3. That is, when the user enters a graphical user interface that embodies the data structure 300 in FIG. 3, only the agent types 302 list is shown. Once the user 180 chooses an agent type 302, then the list 304 is shown. Once the user then chooses an agent service 304 to configures, the set of parameters 306 is shown, and then when a parameters is selected, the values 308 for that parameters are shown. This cascading effect can reduce the complexity of services configuration by masking irrelevant details of other services, parameters, agent types and values and keeps the user focused on the particular agent type, service and parameter settings of interest at that moment.

As another example, the SAN administrator 180 may wish to add or remove a particular file type to the list of file types for the Audio Files parameter. In another example, a parameter, "Executable Files" for example, may have a null value associated with it (i.e., there are no file types listed for the parameter). In this case, the file-level-reporting service will not be applied to any files for that parameter, effectively inactivating the agent service with respect to that parameter. In particular embodiments, the SAN administrator 180 may effectively activate the agent service with respect to the parameter "Execution Files" by adding one or more of the following to the value associated with the parameter: "exe", "dll", "sys", "ocx", "vbx", "vxd", "drv", and "scr". The SAN administrator 180 may select parameter values in a manner similar to the selection of an agent type or the selection of an agent service as described above. The SAN administrator 180 may also enter selected values by typing the selected values on a keyboard, for example.

In step 450, the agent-service-configuration manager 220 receives a selection of a parameter value associated with the at least one selected parameter corresponding to the selected agent service. In response to receiving a selection of a parameter value, the agent-service-configuration manager 220 may update the data structure 300 with received selections of agent type(s), agent service(s), parameter(s), and parameter value(s).

In step 460, the agent-service-configuration manager 220 stores the selected agent type, the selected agent service, the at least one selected parameter, and the selected parameter value. In particular embodiments, the agent-service-configuration manager 220 may store the selected agent type, the selected agent service, the at least one selected parameter, and the selected parameter value in the data structure 300. The selections are stored in a manner that allows them to be retrieved at a later point in time by the agent-service-configuration manager 220 or other applications, such as the management application 132. For example, the selections may be stored in the managed object database 161.

Upon detection of the operation of an agent 155 in the storage area network 100, the storage area network 100 may provide, to the agent 155, at least a portion of the stored data structure 300. For example, agent services performable by the agent 155 may be provided to the agent 155 along with corresponding lists of parameters and corresponding lists of parameter values. In this manner, the agent services performable by the detected agent 155 are configured to operate consistent with SAN administrator 180 selections received by the agent-service-configuration manager 220.

Embodiments disclosed herein provide for efficient configuring of agent services operating in a storage area network. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereof.

What is claimed is:

1. A method comprising:
displaying, on a display screen, a list of agent types, wherein each agent type is compatible for performing at least one different agent service on at least one resource in a Storage Area Network (SAN);
in response to receiving a selection of a first agent type from the list of agent types, displaying a first plurality of agent services currently available for implementation by any agent of the first agent type, wherein the first plurality of agent services is different than a second plurality of agent services currently available for implementation by any agent of a second agent type, wherein the second agent type is concurrently indicated in the list of agent types with the first agent type, and wherein the first agent service and the second agent service both are configurable via a SAN management application;
in response to receiving a selection of a first agent service from the first plurality of agent services, displaying a plurality of configurable parameters of the first agent service, wherein each of the configurable parameters describes a current execution setting of the first agent service;
in response to receiving a new parameters value for a first configurable parameters in the plurality of configurable parameters, creating a configuration file describing the new parameter value; and
upon detecting a respective agent of the first agent type-currently operating remotely in the SAN by the SAN management application;
commencing performance of a first instance of the first agent service; and
transmitting the configuration file to the respective agent, wherein the new parameters provided in the configuration file effects a change in the operation of the first instance of the first agent service as it is performed by the respective agent.

2. The method as in claim 1, wherein transmitting the configuration file to the respective agent comprises transmitting the configuration file to a host agent, the first agent service comprising a service for determining analytics of files accessible to the host in the SAN, wherein the new parameter provided in the configuration file comprises a change in a set of media file type formats to be processed by the first instance of the first agent service.

3. The method as in claim 1, wherein transmitting the configuration file to the respective agent comprises transmitting the configuration file to a network switch agent for managing at least one switch agent service for controlling at least one network switch in the SAN.

4. The method as in claim 1, further comprising, upon receiving the selection of the first agent service from the first plurality of agent services, identifying a current value of each of the plurality of configurable parameters, wherein displaying a plurality of configurable parameters of the first agent service comprises displaying the current value of each of the plurality of configurable parameters.

5. The method as in claim 1, further comprising, upon receiving the selection of the first agent service from the first plurality of agent services, identifying a currently value of each of the plurality of configurable parameters, wherein displaying a plurality of configurable parameters of the first agent service comprises displaying the current value of each of the plurality of configurable parameters, wherein transmitting the configuration file to the respect agent comprises transmitting the configuration file to a host agent, the first agent service comprising a service for determining analytics of files accessible to the host in the SAN, and wherein the new parameter provided in the configuration file comprises a change in a set of media file type formats to be processed by the first instance of the first agent service.

6. The method as in claim 1, further comprising, in response to receiving the selection of a first agent type from the list of agent types, identifying licensing information associated with the SAN, wherein the licensing information identifies a plurality of agent services currently licensed for use by any agent of the first agent type, and wherein displaying the first plurality of agent services comprises displaying the plurality of agent services currently licensed for use by any agent of the first agent type.

7. The method as in claim 1, wherein receiving the selection of the first agent comprises receiving a selection of a File-Level-Reporting service, wherein the File-Level-Reporting service enables any agent of the first agent type to monitor attributes of (i) stored files and (ii) file storage.

8. The method as in claim 7, wherein transmitting the configuration file to the respective agent comprises transmitting the configuration file to an agent initiating commencement of an instance of the File-Level-Reporting service, wherein the new parameter provided in the configuration file changes the instance of the File-Level-Reporting service from monitoring a user's email files to monitoring the user's compressed files.

9. The method as in claim 1, further comprising:
   in response to receiving the selection of the first agent type from the list of agent types, identifying licensing information associated with the SAN, the licensing information identifying a plurality of agent services currently licensed for use by any agent of the first agent type, wherein displaying the first plurality of agent services comprises displaying the plurality of agent service currently licensed for use by any agent of the first agent type; and
   upon receiving the selection of the first agent service from the first plurality of agent services, identifying a current value of each of the plurality of configurable parameters, wherein displaying a plurality of configurable parameters of the first agent service comprises displaying the current value of each of the plurality of configurable parameters, and wherein transmitting the configuration file to the respective agent comprises transmitting the configuration file to a host agent, the first agent service comprising a service for determining analytics of files accessible to the host in the SAN, the new parameter provided in the configuration file comprising a change in a set of media type formats to be processed by the first instance of the first agent service.

10. A non-transitory computer readable storage medium comprising executable instructions encoded hereon operable on a computerized deice to perform operations comprising:
    displaying, on a display screen, a list of agent types, wherein each agent type is compatible for performing at least one different agent service on at least one resource in a Storage Area Network (SAN);
    in response to receiving a selection of a first agent type from the list of agent types, displaying a first plurality of agent services currently available for implementation by any agent of the first agent type, wherein the first plurality of agent services is different than a second plurality of agent services currently available for implementation by any agent of a second agent type, wherein the second agent type is concurrently indicated in the list of agent types with the first agent type, and wherein the first agent service and the second agent service both are configurable via a SAN management application;
    in response to receiving a selection of a first agent service from the first plurality of agent services, displaying a plurality of configurable parameters of the first agent service, wherein each of the configurable parameters describes a current execution setting of the first agent service;
    in response to receiving a new parameters value for a first configurable parameter in the plurality of configurable parameters, creating a configuration file describing the new parameter value; and
    upon detecting a respective agent of the first agent type currently operation remotely in the SAN by the SAN management application;
        commencing performance of a first instance of the first agent service; and
        transmitting the configuration file to the respective agent, wherein the new parameters provided in the configuration file effects a change in the operation of the first instance of the first agent service as it is performed by the respective agent.

11. The non-transitory computer readable storage medium as in claim 10, wherein transmitting the configuration file to the respective agent comprises transmitting the configuration file to a host agent, the first agent service comprising a service for determining analytics of files accessible to the host in the SAN, wherein the new parameter provided in the configuration file comprises a change in a set of media file type formats to be processed by the first instance of the first agent service.

12. The non-transitory computer readable storage medium as in claim 10, wherein transmitting the configuration file to the respective agent comprises transmitting the configuration file to a network switch agent for managing at least one switch agent service for controlling at least one network switch in the SAN.

13. The non-transitory computer readable storage medium as in claim 10, further comprising, upon receiving the selection of the first agent service from the first plurality of agent services, identifying a current value of each of the plurality of configurable parameters, wherein displaying a plurality of configurable parameters of the first agent service comprises displaying the current value of each of the plurality of configurable parameters.

14. The non-transitory computer readable storage medium as in claim 10, further comprising, upon receiving the selection of the first agent service from the first plurality of agent services, identifying a currently value of each of the plurality of configurable parameters, wherein displaying a plurality of configurable parameters of the first agent service comprises displaying the current value of each of the plurality of configurable parameters, wherein transmitting the configuration file to the respect agent comprises transmitting the configuration file to a host agent, the first agent service comprising a service for determining analytics of files accessible to the host in the SAN, and wherein the new parameter provided in the configuration file comprises a change in a set of media file type formats to be processed by the first instance of the first agent service.

15. The non-transitory computer readable storage medium as in claim 10, further comprising, in response to receiving the selection of a first agent type from the list of agent types, identifying licensing information associated with the SAN, wherein the licensing information identifies a plurality of agent services currently licensed for use by any agent of the first agent type, and wherein displaying the first plurality of agent services comprises displaying the plurality of agent services currently licensed for use by any agent of the first agent type.

16. The non-transitory computer readable storage medium as in claim 10, wherein receiving the selection of the first agent comprises receiving a selection of a File-Level-Reporting service, wherein the File-Level-Reporting service enables any agent of the first agent type to monitor attributes of (i) stored files and (ii) file storage.

17. The non-transitory computer readable storage medium as in claim 16, wherein transmitting the configuration file to the respective agent comprises transmitting the configuration file to an agent initiating commencement of an instance of the File-Level-Reporting service, wherein the new parameter provided in the configuration file changes the instance of the File-Level-Reporting service from monitoring a user's email files to monitoring the user's compressed files.

18. The non-transitory computer readable storage medium as in claim 10, further comprising:
   in response to receiving the selection of the first agent type from the list of agent types, identifying licensing information associated with the SAN, the licensing information identifying a plurality of agent services currently licensed for use by any agent of the first agent type, wherein displaying the first plurality of agent services comprises displaying the plurality of agent service currently licensed for use by any agent of the first agent type; and
   upon receiving the selection of the first agent service from the first plurality of agent services, identifying a current value of each of the plurality of configurable parameters, wherein displaying a plurality of configurable parameters of the first agent service comprises displaying the current value of each of the plurality of configurable parameters, and wherein transmitting the configuration file to the respective agent comprises transmitting the configuration file to a host agent, the first agent service comprising a service for determining analytics of files accessible to the host in the SAN, the new parameter provided in the configuration file comprising a change in a set of media type formats to be processed by the first instance of the first agent service.

19. A computer system comprising:
a process;
a memory unit that stores instructions associated with an application executed by the processor; and
an interconnect coupling the processor and the memory unit, enabling the computer system to execute the application and perform operations of:
   displaying, on a display screen, a list of agent types, wherein each agent type is compatible for performing at least one different agent service on at least one resource in a Storage Area Network (SAN);
   in response to receiving a selection of a first agent type from the list of agent types, displaying a first plurality of agent services currently available for implementation by any agent of the first agent type, wherein the first plurality of agent services is different than a second plurality of agent services currently available for implementation by any agent of a second agent type, wherein the second agent type is concurrently indicated in the list of agent types with the first agent type, and wherein the first agent service and the second agent service both ace configurable via a SAN management application;
   in response to receiving a selection of a first agent service from the first plurality of agent services, displaying a plurality of configurable parameters of the first agent service, wherein each of the configurable parameters describes a current execution setting of the first agent service;
   in response to receiving a new parameters value for a first configurable parameters in the plurality of configurable parameters, creating a configuration file describing the new parameter value; and
   upon detecting a respective agent of the first agent type currently operating remotely in the SAN by the SAN management application;
      commencing performance of a first instance of the first agent service; and
      transmitting the configuration file to the respective agent, wherein the new parameters provided in the configuration file effects a change in the operation of the first instance of the first agent service as it is performed by the respective agent.

* * * * *